(12) United States Patent  
Gilling

(10) Patent No.: US 9,381,812 B2  
(45) Date of Patent: Jul. 5, 2016

(54) METHOD TO GRAPHICALLY DISPLAY A VEHICLE CONDITION

(75) Inventor: Earnee Jones Gilling, Ypsilanti, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 90 days.

(21) Appl. No.: 13/408,591

(22) Filed: Feb. 29, 2012

(65) Prior Publication Data

US 2013/0224721 A1    Aug. 29, 2013

(51) Int. Cl.
*G09B 25/02* (2006.01)
*B60K 35/00* (2006.01)
*G09B 19/16* (2006.01)

(52) U.S. Cl.
CPC ............... *B60K 35/00* (2013.01); *G09B 19/16* (2013.01)

(58) Field of Classification Search
CPC ...................................................... G09B 25/02
USPC ............ 340/461; 280/727; 434/71; 510/183; 701/29, 30, 33, 50; 705/14.58; 715/851
See application file for complete search history.

(56) References Cited

U.S. PATENT DOCUMENTS

| | | | |
|---|---|---|---|
| 5,229,602 A | 7/1993 | Juliger | |
| 5,406,303 A | 4/1995 | Salmon et al. | |
| 6,278,424 B1 | 8/2001 | Ayres et al. | |
| 6,768,099 B1* | 7/2004 | Cheng et al. | 250/227.24 |
| 6,842,679 B2 | 1/2005 | Ide et al. | |
| 2002/0107625 A1* | 8/2002 | Beck et al. | 701/50 |
| 2005/0282719 A1* | 12/2005 | Egan et al. | 510/183 |
| 2005/0288830 A1 | 12/2005 | Reeser et al. | |
| 2008/0147265 A1* | 6/2008 | Breed | 701/30 |
| 2008/0161989 A1* | 7/2008 | Breed | 701/29 |
| 2009/0043441 A1* | 2/2009 | Breed | G06K 7/10178 701/31.9 |
| 2009/0134606 A1* | 5/2009 | Schofield et al. | 280/727 |
| 2009/0283605 A1* | 11/2009 | Arkashevski | B60S 1/50 239/13 |
| 2010/0042952 A1* | 2/2010 | Geesey | G06Q 50/30 715/851 |
| 2010/0076642 A1* | 3/2010 | Hoffberg et al. | 701/29 |
| 2010/0127847 A1* | 5/2010 | Evans et al. | 340/461 |
| 2011/0076651 A1* | 3/2011 | Best et al. | 434/71 |
| 2011/0153150 A1* | 6/2011 | Drew et al. | 701/33 |
| 2012/0036016 A1* | 2/2012 | Hoffberg et al. | 705/14.58 |

FOREIGN PATENT DOCUMENTS

| | | |
|---|---|---|
| JP | 2003-285701 A | 10/2003 |
| JP | 2005-119465 A | 5/2005 |
| KR | 1020100113959 | 10/2010 |

OTHER PUBLICATIONS

International Search Report and Written Opinion dated May 15, 2013 related to PCT/US13/023558.

* cited by examiner

*Primary Examiner* — Robert J Utama
*Assistant Examiner* — Elroy S Crocker
(74) *Attorney, Agent, or Firm* — Dinsmore & Shohl LLP

(57) ABSTRACT

A method for graphically displaying a vehicle condition within an automotive vehicle is disclosed. The method includes the steps of receiving information from a sensor on a vehicle regarding a vehicle condition. The vehicle condition is measured against a predetermined level for that specified vehicle condition. The method then determines if the vehicle condition is above the predetermined level. If the vehicle condition is above the predetermined level, the method then transmits information regarding the vehicle condition to a processor connected to a display screen. The method then proceeds to graphically display the vehicle condition on a vehicle within the vehicle by means of a graphical replication of an image replication of the actual vehicle condition in the actual vehicle being used.

10 Claims, 2 Drawing Sheets

METHOD TO GRAPHICALLY DISPLAY A VEHICLE CONDITION

FIELD OF THE INVENTION

This invention relates generally to indicators, and more specifically, to replica graphical display indicators within a vehicle.

BACKGROUND OF THE INVENTION

It is common and well known in the art for an instrument panel of a vehicle to contain clusters of a plurality of information indicators, commonly known as telltales. It is commonly known to provide ten to thirty telltales within an instrument panel thereby heavily cluttering the instrument panel of a vehicle. The clutter of telltales limits the design and functionality of the instrument panel within the vehicle. Furthermore, increased parts and weight are required to provide for the plurality of telltales within the instrument panel including, but not limited to, light bulbs, LEDs, stencils, outlines, and other plastic or metal parts required for making the telltale. The telltale assemblies are complex with wiring and require a significant amount of installation. All of these factors increase the cost of production of including numerous telltales within the vehicle instrument panel. Bulb life, either incandescent or LED, and reliability of these bulbs provide for increased cost throughout the life of the vehicle.

Numerous devices are known which have attempted to solve the cost and performance issues as described above. Ayres (U.S. Pat. No. 6,278,424) teaches a miniature telltale module which combines a plurality of telltale functions into one unit and provides reduced cost per function. The module uses a miniature rotary actuator, an image disc having a plurality of interconnected images, icons, and a single light source. Although Ayres attempts to solve the problem of increased cost and efficiency of a plurality of telltales, Ayres does not eliminate the required extra parts for manufacturing a telltale.

It is well known in the art to provide a vehicle display screen located within the vehicle. The display screen is operable to display things such as GPS navigation, radio controls, or other vehicle controls essential to the operation of the vehicle. It is common and well known in the art at present to provide these screens in all automotive vehicles. Although it is known to provide warnings similar to telltale warnings within this vehicle display screen, it is not known to provide a replica of the vehicle the user is presently driving to illustrate the vehicle condition.

The present invention provides this new concept by disclosing the use of a replica vehicle to illustrate a vehicle condition to replace the use of a plurality of telltales within the instrument panel.

SUMMARY OF THE INVENTION

The present invention provides for a method for graphically displaying a vehicle condition within an automotive vehicle. The method includes the steps of receiving information from a sensor on a vehicle regarding a vehicle condition. The vehicle condition is measured against a predetermined level for that specified vehicle condition. The method then determines if the vehicle condition is above the predetermined level. If the vehicle condition is above the predetermined level, the method then transmits information regarding the vehicle condition to a processor connected to a display screen. The method then proceeds to graphically display the vehicle condition on a vehicle within the vehicle by means of a graphical replication of an image replication of the actual vehicle condition in the actual vehicle being used. By way of example, if the user is driving a blue Toyota Prius, and the tire pressure is low on that Prius, an image and possibly follow-up instructions on how to remedy the situation will be displayed to the user illustrating an exact replica of the blue Toyota Prius the user is driving. The graphical display will include an indicator, such as an arrow or other indicator, to the tire of the vehicle indicating to the user that the tire pressure is low. The graphical display may include the actual tire pressure reading as measured by a sensor on the tire itself.

By way of further example, if the dynamic radar cruise sensing needs cleaning, an image of the front of the vehicle will be displayed. The image of the vehicle will be an exact replica of the vehicle that the user is driving, i.e. if the user is driving a green Toyota Camry, an image of the front of a green Toyota Camry will appear in the display screen. The display of the green Toyota Camry's front end will illustrate where the user is required to clean to correct the vehicle condition that the dynamic radar cruise sensor needs cleaning.

DETAILED DESCRIPTION OF THE PRESENT INVENTION

This invention relates generally to a method and system for graphically displaying a vehicle condition on a display screen within an automotive vehicle. The graphical display of the vehicle is an exact replica of the vehicle the user is presently driving. By way of example, if the user is currently driving a 2012 red Sienna minivan, and the tire pressure is low on one of the tires of the vehicle, the graphical display will display a red Toyota 2012 Sienna and corresponding information indicating that the tire pressure on the Sienna is low. This method including the use of sensors, a processor, and a display screen may be used and is used to display vehicle replica warnings for areas such as the dynamic radar sensor, doors ajar, windows open, moon roof open, and other similar equivalent warnings to be displayed to the user.

Figure 1:
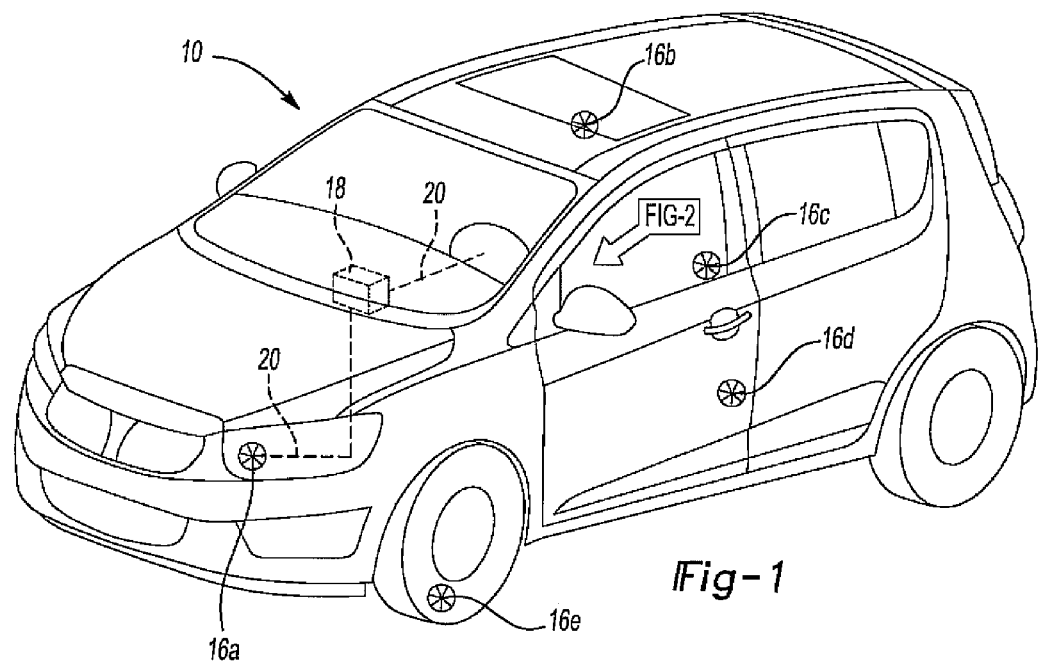
FIG. 1 illustrates a perspective view of a vehicle having a plurality of sensors and a display screen.
Figure 2:
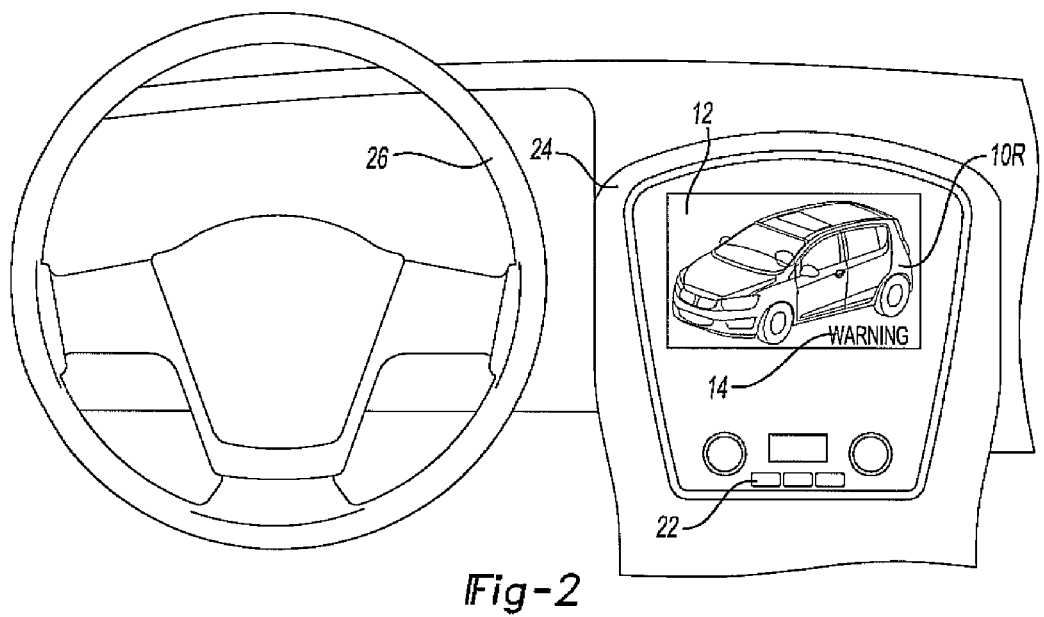
FIG. 2 illustrates a frontal view of the dashboard of the vehicle as shown in FIG. 1.

FIGS. 1 and 2 illustrate a perspective view of a vehicle 10 having a display screen 12 operable to display a warning or indicator 14 to a user within the vehicle 10. The warning 14 illustrates an exact replica 10r of the vehicle 10. As shown in FIG. 2, the vehicle illustrated 10R in the display 12 is the exact vehicle 10 as shown in FIG. 1. The vehicle 10 further includes a plurality of sensors 16. The sensors include the dynamic radar sensor 16a, the moon roof sensor 16b, the window sensor 16c, the door sensor 16d, and the vehicle tire pressure sensor 16e. These sensors are in direct communication with a processor 18. The sensors are in communication with the processor 18 by means of wireless means, such as BLUETOOTH®, or physically wired means. The connections 20 may be wireless or hardwired. The processor is operable to make decisions about what is to be displayed on the display. In one embodiment, the processor is a computer.

Figure 3:
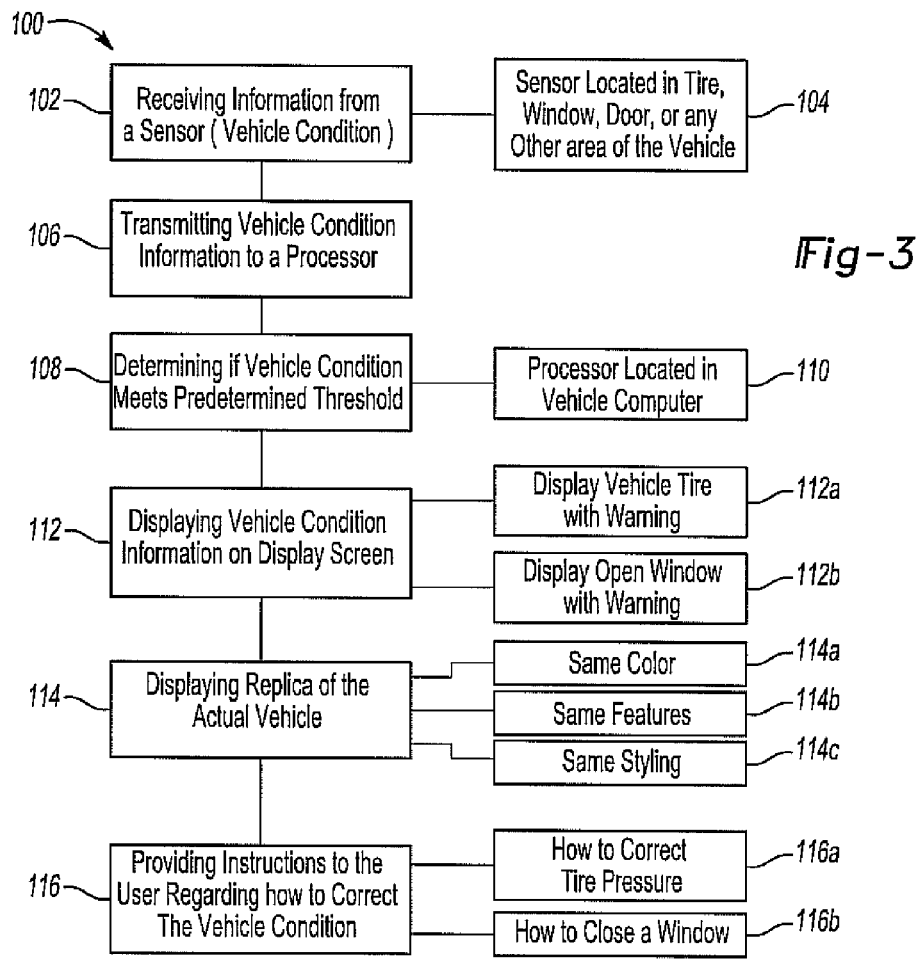
FIG. 3 illustrates a flow diagram of the method of displaying an image to the vehicle's user.

FIG. 3 illustrates the method for which information is displayed on a vehicle display screen on a replica vehicle image. The method 100 includes the steps of first receiving information from a sensor 16 regarding the vehicle condition 102. The sensors are located 104 either in the tire, window, door, or other sensors on sensors in any other area on the vehicle. The method 100 further includes the step of determining if the vehicle condition 102, 104 meets a predetermined level or threshold 106. If the vehicle condition 102, 104 meets the predetermined level 106, a signal is transmitted regarding the vehicle condition to a processor 108. The processor transmission 108 may be included within a vehicle computer 110. The information is then displayed 112. The processor 108 determines the correct information to be displayed 112. The processor 108 is a computer or other device operable to make decisions.

The display of the vehicle condition 112 is displayed on an already existing screen, such as a GPS navigation screen. The information displayed includes information regarding the display of a vehicle tire with a warning 112. The information displayed may also include the actual tire pressure reading and/or instructions regarding how to remedy the current vehicle condition. Further by way of example, the vehicle display may be a display of an open window with a warning that the window is in fact open 112b. Other displays of information may include a display that a moon roof is open or that an area of the vehicle, such as a sensor, requires cleaning. The graphical display may also include instructions on how to remedy the vehicle condition. This may include instructions on how to close a vehicle moon roof, how to close a vehicle door, how to close a vehicle window, how to clean a certain area of a vehicle, how to clean a sensor, or how to fill the tire pressure. The processor 108 is operable to determine based upon the signal transmitted to the processor what the appropriate message or instructions are to be displayed.

The displaying of the vehicle condition 112 further requires displaying a replica of the actual vehicle 114. The replica of the actual vehicle is displayed within the display unit. By way of example, if the user is driving a green 2012 Prius, a green 2012 Prius will be displayed on the display screen showing exactly where or what the vehicle condition is. The vehicle displayed will include a replication of color and styling of the vehicle the user is driving. The replica of the vehicle 114 as displayed in the display screen will be the same color 114a, have the same features 114b, and have the same styling 114c as the vehicle the user is currently driving.

The method 100 further includes the step of providing instructions to the user 116 regarding how to correct the vehicle condition. For example, if the tire pressure is low, the display will include instructions regarding how to correct the tire pressure 116a. This may include instructions regarding how to fill the tire with air or instructing the user to take the vehicle to a shop for service. A further example and embodiment includes a display regarding instructions on how to close a window 116b. The display may show an actual button on a vehicle which is the button required to close the window.

Figure 4:
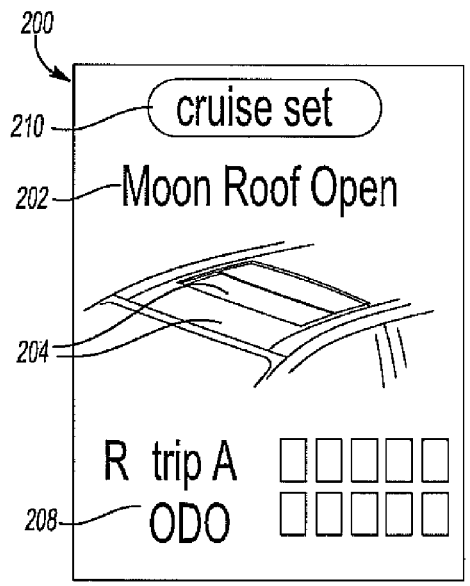
FIG. 4 illustrates an exemplary display of a replica vehicle.

FIG. 4 illustrates a display screen 200 including a warning 202 including a replica of the vehicle the user is driving. The display screen 200 includes the warning 202 with the verbiage "moon roof open." The warning 202 further includes a graphical display of an exact replica vehicle 204 which the user is driving. The vehicle 204 further includes a replica of the moon roof 206 for which the user is driving. In a secondary embodiment, the display and warning 202 will include instructions on how to properly close the moon roof 206 as shown in the display 200. The display 200 further includes optional lower indicator bar 208 and upper indicator bar 210. The lower indicator bar displays information regarding the current trip and miles traveled. The upper indicator bar indicates that cruise control is set. Other optional warnings or indicators may be displayed in the lower bar 208 and the upper bar 210.

Figure 5:
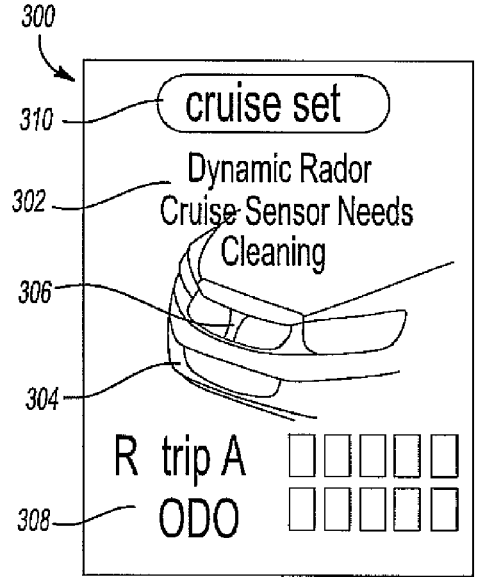
FIG. 5 illustrates a graphical display of a vehicle replication.

FIG. 5 illustrates the display screen 300 indicating to the user that the dynamic radar cruise sensor needs cleaning. The display 300 includes a warning 302 including the verbiage "dynamic radar cruise sensor needs cleaning." The display 300 further includes an exact replica of the vehicle the user is driving 304 including a close-up 306 of the area of the vehicle for which cleaning is required. The display 300 further includes a lower bar 308 and an upper bar 310 to display information valuable to the user. In the present embodiment, the lower bar 308 includes information regarding the current trip. The upper bar 310 includes information regarding the cruise control of the vehicle.

This invention is not restricted to the illustrative examples and embodiments described above. The embodiments are not intended as limitations on the scope of the invention. Methods, apparatus, compositions, and the like described herein are exemplary and not intended as limitations on the scope of the invention. Changes therein and other uses will occur to those skilled in the art. The scope of the invention is defined by the scope of the appended claims.

The invention claimed is:

1. A system for graphically displaying a vehicle condition within a vehicle having a dashboard display screen, the system comprising:
   a sensor, the sensor configured to receive information regarding a vehicle condition, the vehicle condition having a predetermined level, the sensor being a sensor from the following group: a dynamic radar sensor, a tire pressure sensor, a door sensor, a window sensor or a moon roof sensor;
   a processor within the vehicle, the processor adapted to receive information regarding the vehicle condition;
   a display screen within the vehicle, the processor connected to the display screen, the processor configured to determine if the vehicle condition is above the predetermined level, the processor determining the correct information to display, the processor configured to modify the information displayed on the dashboard display screen based on the information received from the sensor;
   the processor graphically displaying an exact replication of the vehicle, and the processor graphically displaying the vehicle condition on the dashboard display screen within the vehicle by means of a computer graphical replication of an image replication of the actual vehicle condition on the replication of the current user vehicle being used, the current user vehicle color and features being displayed on the dashboard display screen to exactly replicate the current user vehicle actually being used allowing the user to easily locate the vehicle condition; and
   the processor graphically providing instructions and graphically indicating problem location on the replica current user vehicle on the dashboard display screen to the user indicating how to correct the vehicle condition by indicating where the problem exists on the replica current user vehicle displayed on the display screen.

2. The system of claim 1 wherein the sensor is operable to detect an open window.

3. The system of claim 2 wherein the information regarding the vehicle condition transmitted to the processor is an open window.

4. The system of claim 1 wherein a graphical replication of the vehicle is graphically displayed to the user specifically showing the open vehicle window.

5. The system of claim 4 further including the step of providing instructions on how to close the window.

6. The system of claim 1 wherein the sensor is operable to measure cleanliness levels of a vehicle part.

7. The system of claim 6 wherein the information regarding the vehicle condition transmitted to the processor is a cleanliness level above a predetermined level.

8. The system of claim 7 wherein a graphical replication of the vehicle is graphically displayed to the user specifically showing where the vehicle requires cleaning.

9. The system of claim 8 further including the step of providing instructions to the user regarding how to clean the area to be cleaned.

10. The system of claim 1 wherein the graphical replication of the vehicle is a replication of the exact vehicle the user is operating.

\* \* \* \* \*

UNITED STATES PATENT AND TRADEMARK OFFICE
CERTIFICATE OF CORRECTION

PATENT NO. : 9,381,812 B2
APPLICATION NO. : 13/408591
DATED : July 5, 2016
INVENTOR(S) : Earnée Jones Gilling It is certified that error appears in the above-identified patent and that said Letters Patent is hereby corrected as shown below:

On the title page item (75), Inventor, delete "Earnee Jones Gilling" and insert
--Earnée Jones Gilling--, therefor.

Signed and Sealed this
Twenty-third Day of August, 2016

Michelle K. Lee
*Director of the United States Patent and Trademark Office*